(12) United States Patent
Kanemitsu et al.

(10) Patent No.: US 8,144,222 B2
(45) Date of Patent: Mar. 27, 2012

(54) IMAGE PROCESSING DEVICE, IMAGE PROCESSING METHOD, AND IMAGING DEVICE

(75) Inventors: Shiroshi Kanemitsu, Kanagawa (JP);
Hirotoshi Aizawa, Kanagawa (JP);
Takaaki Kawakami, Kanagawa (JP);
Kazuhiro Tabuchi, Kanagawa (JP);
Junichi Hosokawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 244 days.

(21) Appl. No.: 12/706,186

(22) Filed: Feb. 16, 2010

(65) Prior Publication Data

US 2010/0225781 A1 Sep. 9, 2010

(30) Foreign Application Priority Data

Mar. 6, 2009 (JP) ................. 2009-053616

(51) Int. Cl.
*H04N 3/14* (2006.01)
*H04N 5/335* (2011.01)
*H04N 9/04* (2006.01)
*H04N 5/228* (2006.01)
*H04N 1/46* (2006.01)
*G09G 5/00* (2006.01)
*G06K 9/32* (2006.01)

(52) U.S. Cl. ............ 348/273; 348/280; 348/222.1; 358/525; 345/606; 382/300

(58) Field of Classification Search .......... 348/273, 348/280, 279, 272; 358/525; 345/606, 610; 382/300

See application file for complete search history.

(56) References Cited

U.S. PATENT DOCUMENTS

| 5,418,565 | A  | * | 5/1995  | Smith ......................... 348/273 |
| 6,639,691 | B2 | * | 10/2003 | Acharya ....................... 358/1.9 |
| 6,836,289 | B2 | * | 12/2004 | Koshiba et al. .............. 348/273 |
| 7,292,725 | B2 | * | 11/2007 | Chen et al. ................... 382/167 |
| 7,554,583 | B2 | * | 6/2009  | Kuno et al. ................... 348/241 |
| 7,643,074 | B2 | * | 1/2010  | Kuno et al. ................... 348/280 |
| 7,889,252 | B2 | * | 2/2011  | Tamura et al. ................ 348/272 |
| 2008/0043131 | A1 | * | 2/2008 | Tamura et al. ................ 348/311 |
| 2009/0109296 | A1 | * | 4/2009 | Kuno et al. ................. 348/222.1 |

FOREIGN PATENT DOCUMENTS

| JP | 2001-197512 |   | 7/2001  |
| JP | 2003174567 A | * | 6/2003 |
| JP | 2004128564 A | * | 4/2004 |
| JP | 2006033333 A | * | 2/2006 |
| JP | 2007288394 A | * | 11/2007 |
| JP | 2008042313 A | * | 2/2008 |

* cited by examiner

*Primary Examiner* — John Villecco
(74) *Attorney, Agent, or Firm* — Oblon, Spivak, McClelland, Maier & Neustadt, L.L.P.

(57) ABSTRACT

A pixel-interpolation processing unit generates a sensitivity level value of an insufficient color component according to interpolation processing of image signals. A sensitivity level value of an insufficient color component in a pixel of attention is calculated, according to an arithmetic operation corresponding to an acquired color component of the pixel of attention, by assuming a geometric figure including sensitivity level values of acquired color components as vertexes. As the geometric figure, the same figure is used irrespectively of which color component the acquired color component is.

20 Claims, 11 Drawing Sheets

FIG.19

| R | Gr | R1 | Gr | R |
|---|---|---|---|---|
| Gb | B1 | Gb1 | B4 | Gb |
| R2 | Gr1 | R0 | Gr2 | R4 |
| Gb | B2 | Gb2 | B3 | Gb |
| R | Gr | R3 | Gr | R |

R=R0
G=(Gb1+Gb2+Gr1+Gr2)/4+(R0-(R1+R2+R3+R4)/4)/4
B=(B1+B2+B3+B4)/4+(R0-(R1+R2+R3+R4)/4)/2

| B | Gb | B1 | Gb | B |
|---|---|---|---|---|
| Gr | R1 | Gr1 | R4 | Gr |
| B2 | Gb1 | B0 | Gb2 | B4 |
| Gr | R2 | Gr2 | R3 | Gr |
| B | Gb | B3 | Gb | B |

R=(R1+R2+R3+R4)/4+(B0-(B1+B2+B3+B4)/4)/2
G=(Gb1+Gb2+Gr1+Gr2)/4+(B0-(B1+B2+B3+B4)/4)/4
B=B0

| Gr | R3 | Gr1 | R4 | Gr |
|---|---|---|---|---|
| B3 | Gb1 | B1 | Gb4 | B5 |
| Gr2 | R1 | Gr0 | R2 | Gr4 |
| B4 | Gb2 | B2 | Gb3 | B6 |
| Gr | R5 | Gr3 | R6 | Gr |

R=(R3+2*R1+R5+R4+2*R2+R6)/8+(Gr0-(Gr1+Gr2+Gr3+Gr4)/4)/2
G=Gr0+[(Gb1+Gb2+Gb3+Gb4)/4-(Gr1+Gr2+Gr3+Gr4)/4]/2
B=(B3+2*B1+B5+B4+2*B2+B6)/8+(Gr0-(Gr1+Gr2+Gr3+Gr4)/4)/2

| Gb | B3 | Gb1 | B4 | Gb |
|---|---|---|---|---|
| R3 | Gr1 | R1 | Gr4 | R5 |
| Gb2 | B1 | Gb0 | B2 | Gb4 |
| R4 | Gr2 | R2 | Gr3 | R6 |
| Gb | B5 | Gb3 | B6 | Gb |

R=(R3+2*R1+R5+R4+2*R2+R6)/8+(Gb0-(Gb1+Gb2+Gb3+Gb4)/4)/2
G=Gb0+[(Gr1+Gr2+Gr3+Gr4)/4-(Gb1+Gb2+Gb3+Gb4)/4]/2
B=(B3+2*B1+B5+B4+2*B2+B6)/8+(Gb0-(Gb1+Gb2+Gb3+Gb4)/4)/2

IMAGE PROCESSING DEVICE, IMAGE PROCESSING METHOD, AND IMAGING DEVICE

CROSS-REFERENCE TO RELATED APPLICATIONS

This application is based upon and claims the benefit of priority from the prior Japanese Patent Application No. 2009-53616, filed on Mar. 6, 2009; the entire contents of which are incorporated herein by reference.

BACKGROUND OF THE INVENTION

1. Field of the Invention

The present invention relates to an image processing device, an image processing method, and an imaging device.

2. Description of the Related Art

A so-called 1CCD imaging device as one of full-color imaging devices is suitable for consumer apparatuses required to be reduced in size and cost such as a digital still camera (DSC) and a cellular phone with camera. In the 1CCD imaging device, any one of color filters for red (R), green (G), and blue (B) is provided on a photoelectric element and a sensitivity signal of an insufficient color component is calculated for each of pixel positions to obtain image signals for a plurality of colors from one two-dimensional imaging element. A sensitivity level value of the insufficient color component is generated by interpolating sensitivity level values of pixels present around a pixel of attention. For example, Japanese Patent Application Laid-Open No. 2001-197512 proposes a technology for assuming a geometric figure in a three-dimensional space and generating, based on a segment homothetic ratio of the geometric figure, a sensitivity level value of an insufficient color component.

For example, when a pixel for R, an acquired color component of which is an R component, is set as a pixel of attention, a sensitivity level value of an insufficient color component is calculated by assuming a geometric figure similar to a geometric figure having, as vertexes, a sensitivity level value of the pixel of attention and sensitivity level values of pixels for R present around the pixel of attention. In the case of the Bayer array known in the past as a pixel array of 1CCD two-dimensional imaging elements, the sensitivity level value of the insufficient color component can be calculated by assuming pyramids as the geometric figures similar to each other irrespectively of whether the pixel of attention is the pixel for R or the pixel for B. On the other hand, when the pixel of attention is the pixel for G, because an array of pixels for G is different from those of pixels for R and pixels for B, the sensitivity level value of the insufficient color component is calculated by assuming a triangle as the geometric figures similar to each other. In this way, different geometric figures are assumed according to the acquired color component of the pixel of attention. Therefore, in some case, a difference occurs in accuracy of an arithmetic operation for the sensitivity level value of the insufficient color component. When the triangle is used as the geometric figures, the number of pixels, sensitivity level values of which are referred to, is small compared with that in the case of the pyramid. Therefore, R light and B light having low sensitivity compared with G light are interpolated with a smaller number of data. Consequently, the interpolation tends to be affected by output fluctuation in the pixels and the accuracy is further deteriorated.

BRIEF SUMMARY OF THE INVENTION

An image processing device according to an embodiment of the present invention comprises: a pixel-interpolation processing unit that generates a sensitivity level value of an insufficient color component according to interpolation processing of image signals obtained by image pickup of a subject image, wherein the pixel-interpolation processing unit includes an arithmetic unit that outputs a sensitivity level value of the insufficient color component in the pixel of attention according to an arithmetic operation corresponding to an acquired color component, a sensitivity level value of which is acquired for the pixel of attention, and with an axis in a height direction perpendicular to two-dimensional directions, in which pixels are arrayed, set as an axis representing a sensitivity level value, assuming a first geometric figure that is a geometric figure including, as vertexes, the sensitivity level value acquired for the pixel of attention and sensitivity level values acquired for a plurality of first reference pixels that are pixels located near the pixel of attention and have acquired color components same as that of the pixel of attention, and a second geometric figure that is a geometric figure including, as vertexes, acquired sensitivity level values for a plurality of second reference pixels that have color components other than the acquired component of the pixel of attention as acquired color components and are located near the pixel of attention, the arithmetic unit calculates, such that the second geometric figure has a shape similar to that of the first geometric figure, a sensitivity level value of the insufficient color component in the pixel of attention and uses a same figure as the geometric figure irrespectively of which color component the acquired color component of the pixel of attention is.

An image processing method according to an embodiment of the present invention comprises: generating a sensitivity level value of an insufficient color component according to interpolation processing of image signals obtained by image pickup of a subject image; outputting a sensitivity level value of the insufficient color component in the pixel of attention according to an arithmetic operation corresponding to an acquired color component, a sensitivity level value of which is acquired for the pixel of attention; with an axis in a height direction perpendicular to two-dimensional directions, in which pixels are arrayed, set as an axis representing a sensitivity level value, assuming a first geometric figure that is a geometric figure including, as vertexes, the sensitivity level value acquired for the pixel of attention and sensitivity level values acquired for a plurality of first reference pixels that are pixels located near the pixel of attention and have acquired color components same as that of the pixel of attention, and a second geometric figure that is a geometric figure including, as vertexes, acquired sensitivity level values for a plurality of second reference pixels that have color components other than the acquired component of the pixel of attention as acquired color components and are located near the pixel of attention, calculating, such that the second geometric figure has a shape similar to that of the first geometric figure, a sensitivity level value of the insufficient color component in the pixel of attention; and using a same figure as the geometric figure irrespectively of which color component the acquired color component of the pixel of attention is.

An imaging device according to an embodiment of the present invention comprises: an image processing device that applies image processing to image signals obtained by image pickup of a subject image, wherein the image processing device includes a pixel-interpolation processing unit that generates a sensitivity level value of an insufficient color component according to interpolation processing of the image signals, the pixel-interpolation processing unit includes an arithmetic unit that outputs a sensitivity level value of the insufficient color component in the pixel of attention according to an arithmetic operation corresponding to an acquired color component, a sensitivity level value of which is acquired for the pixel of attention, and with an axis in a height direction perpendicular to two-dimensional directions, in which pixels are arrayed, set as an axis representing a sensitivity level value, assuming a first geometric figure that is a geometric figure including, as vertexes, the sensitivity level value acquired for the pixel of attention and sensitivity level values acquired for a plurality of first reference pixels that are pixels located near the pixel of attention and have acquired color components same as that of the pixel of attention, and a second geometric figure that is a geometric figure including, as vertexes, acquired sensitivity level values for a plurality of second reference pixels that have color components other than the acquired component of the pixel of attention as acquired color components and are located near the pixel of attention, the arithmetic unit calculates, such that the second geometric figure has a shape similar to that of the first geometric figure, a sensitivity level value of the insufficient color component in the pixel of attention and uses a same figure as the geometric figure irrespectively of which color component the acquired color component of the pixel of attention is.

BRIEF DESCRIPTION OF THE DRAWINGS

FIG. 19 is a diagram for explaining examples of arithmetic expressions for generating a sensitivity level value of an insufficient color component.

DETAILED DESCRIPTION OF THE INVENTION

Exemplary embodiments of image processing device, image processing method, and imaging device according to the present invention will be explained below in detail with reference to the accompanying drawings. The present invention is not limited to the following embodiments.

Figure 1:
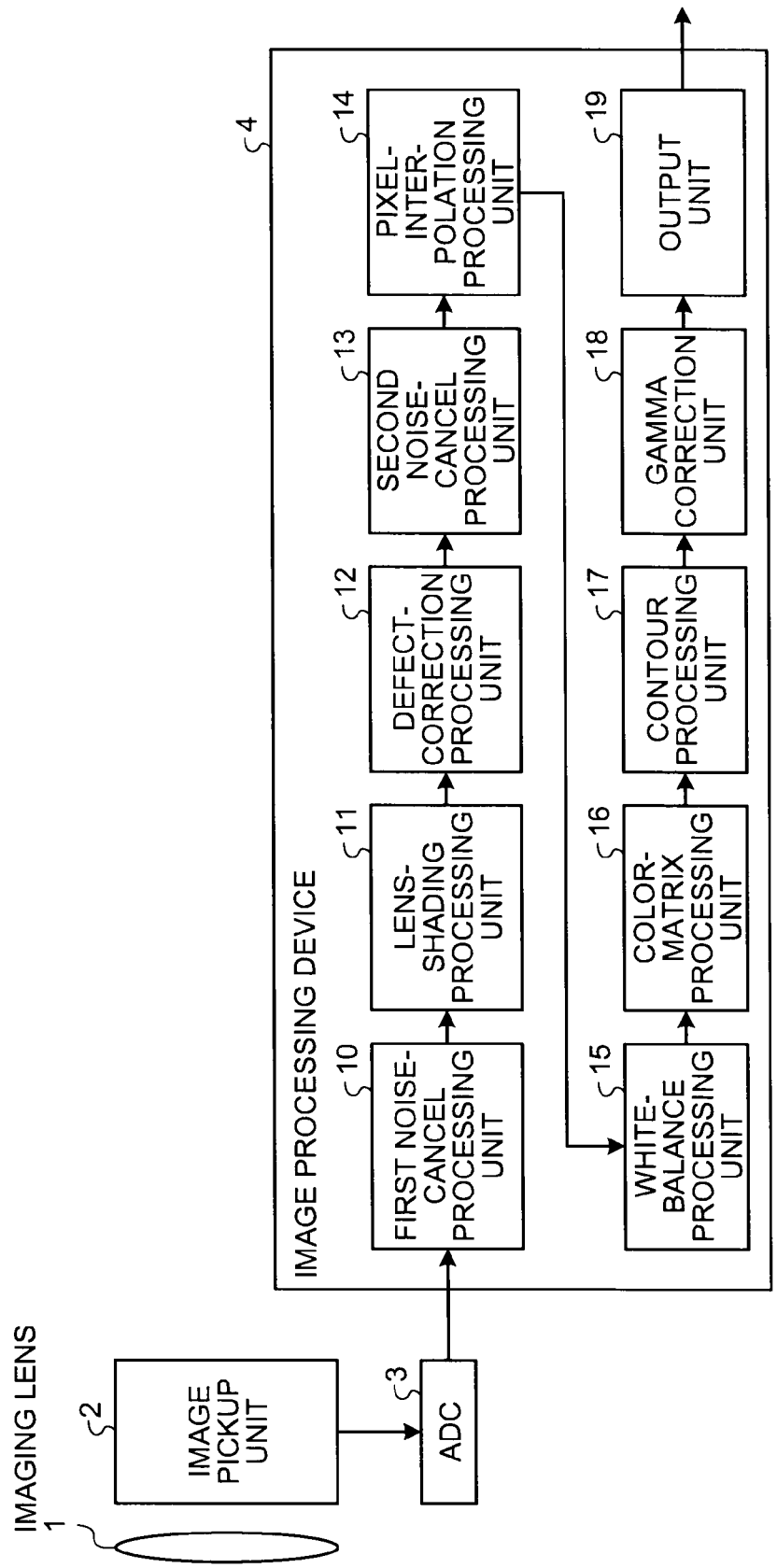
FIG. 1 is a block diagram of an imaging device according to a first embodiment of the present invention.

FIG. 1 is a block diagram of a solid-state imaging device as an imaging device according to a first embodiment of the present invention. The solid-state imaging device includes an imaging lens 1, an image pickup unit 2, an analog-digital converter (ADG) 3, and an image processing device 4. The imaging lens 1 captures light from a subject. The image pickup unit 2 coverts the light from the subject into a signal charge to thereby pick up a subject image. The image pickup unit 2 captures pixel values of red, blue, and green in order corresponding to the Bayer array, sequentially amplifies captured analog image signals with a gain corresponding to an imaging condition designated from the outside, and outputs the analog image signals. The ADC 3 converts the analog image signals output from the image pickup unit 2 into digital image signals. The image processing device 4 applies various kinds of image processing to the digital image signals output from the ADC 3.

The image processing device 4 includes a first noise-cancel processing unit 10, a lens-shading processing unit 11, a defect-correction processing unit 12, a second noise-cancel processing unit 13, a pixel-interpolation processing unit 14, a white-balance processing unit 15, a color-matrix processing unit 16, a contour processing unit 17, a gamma correction unit 18, and an output unit 19.

The first noise-cancel processing unit 10 removes a signal different from a signal of the subject image such as shot noise from the digital image signals output from the ADC 3. Arithmetic operation accuracy in processing of the units at later stages is improved by noise cancel processing at a first stage of the image processing device 4. The first noise-cancel processing unit 10 is configured not to use a line memory to hold down a circuit size and power consumption. The first noise-cancel processing unit 10 sequentially executes the noise cancel processing on the digital image signals transmitted in the order corresponding to the Bayer array. Therefore, the first noise-cancel processing unit 10 executes the noise cancel processing based on one-dimensional arrangement of pixel values of the digital image signals in a pixel frame.

The lens-shading processing unit 11 executes, on the digital image signals subjected to the noise cancel processing by the first noise-cancel processing unit 10, electric shading correction by multiplying the digital image signals with correction coefficients separately determined according to positions of pixels corresponding to the digital image signals. The defect-correction processing unit 12 executes defect correction processing on the digital image signals subjected to the shading correction by the lens-shading processing unit 11. The defect correction processing is processing for correcting defective portions (defects) of the digital image signals due to pixels that do not normally function in the image pickup unit 2.

The second noise-cancel processing unit 13 executes the noise cancel processing again on the digital image signals subjected to the defect correction processing by the defect-correction processing unit 12. The second noise-cancel processing unit 13 is configured to use a line memory. The second noise-cancel processing unit 13 temporarily stores, in the line memory, data of the digital image signals transmitted in the order corresponding to the Bayer array. The second noise-cancel processing unit 13 executes, on the data stored in the line memory, noise cancel processing based on an array of pixels in two-dimensional directions by using a two-dimensional filter or the like.

The pixel-interpolation processing unit 14 executes pixel interpolation processing (mosaic processing) on the digital image signals subjected to the noise cancel processing by the second noise-cancel processing unit 13 and transmitted in the order corresponding to the Bayer array. The pixel-interpolation processing unit 14 generates a sensitivity level value of an insufficient color component according to interpolation processing for the image signals obtained by the image pickup of the subject image. The white-balance processing unit 15 executes white balance processing on the digital image signals subjected to the mosaic processing by the pixel-interpolation processing unit 14.

The color-matrix processing unit 16 executes color matrix arithmetic processing (color reproducibility processing) for obtaining color reproducibility on the digital image signals subjected to the white balance processing by the white-balance processing unit 15. The contour processing unit 17 executes contour highlighting processing on the digital image signals subjected to the color reproducibility processing by the color-matrix processing unit 16 using a correction coefficient calculated based on the imaging condition in the image pickup unit 2 and the positions of the pixels.

The gamma correction unit 18 executes gamma correction on the digital image signals subjected to the contour highlighting processing by the contour processing unit 17. The output unit 19 outputs the digital image signals obtained by the execution of the image processing to the outside. The configuration of the image processing device 4 explained in this embodiment is only an example. Changes such as addition of components for other kinds of processing and omission of components that can be omitted can be applied to the configuration as appropriate.

Figure 2:
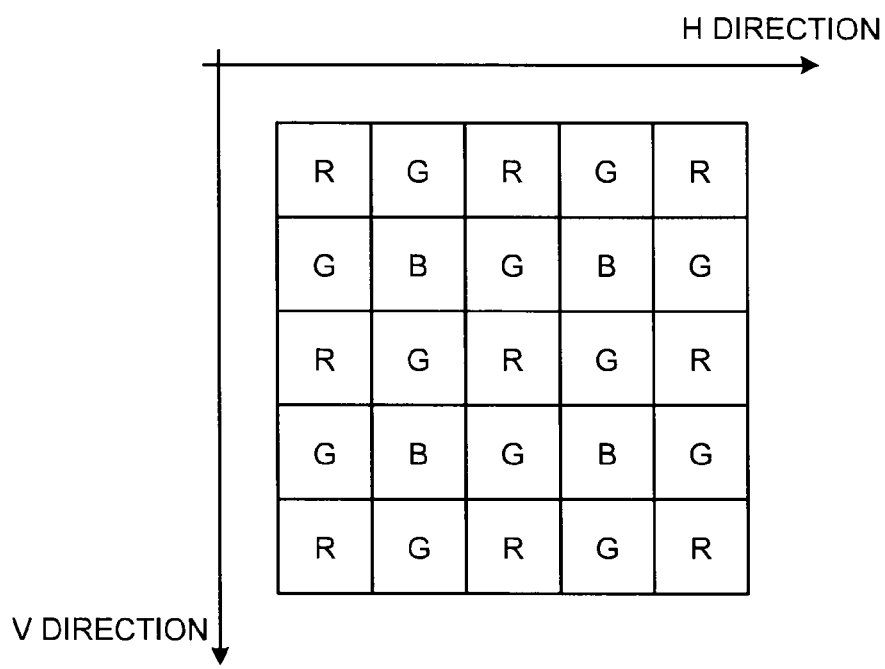
FIG. 2 is a diagram for explaining the arrangement of pixels by the Bayer array.

FIG. 2 is a diagram for explaining the arrangement of pixels by the Bayer array. In FIG. 2, squares denoted by "R", squares denoted by "G", and squares denoted by "B" respectively represent pixels for red (R), pixels for green (G), and pixels for blue (B). The pixels for R correspond to photoelectric elements including color filters for selectively transmitting an R component. The pixels for R have R components as acquired color components and have G and B components as insufficient color components. The pixels for G correspond to photoelectric elements including color filters for selectively transmitting the G component. The pixels for G have G components as acquired color components and have the R and B components as insufficient color components. The pixels for B correspond to photoelectric elements including color filters for selectively transmitting the B component. The pixels for B have B components as acquired color components and have the R and G components as insufficient color components.

It is assumed that the pixels are arrayed in parallel in the two-dimensional directions including an H direction and a V direction perpendicular to each other. Rows in which the pixels for R and the pixels for G are alternately arrayed in parallel in the H direction and rows in which the pixels for G and the pixels for B are alternately arrayed in parallel in the H direction are alternately arranged in the V direction. The pixels for G are adjacent to one another in an oblique direction with respect to the H direction and the V direction. In the array shown in FIG. 2, the digital image signals are sequentially input to each of the pixels toward the right side in the H direction on one row and, when reaching the right end, subsequently input from the pixel at the left end of a row right below the row in the V direction.

Figure 3:
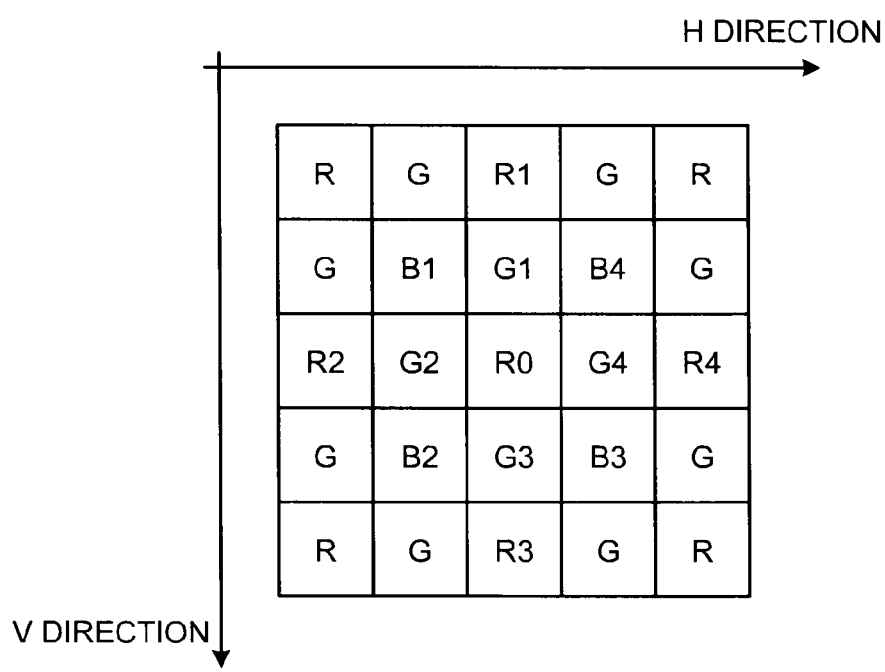
FIG. 3 is a diagram for explaining pixels referred to when a sensitivity level value of an insufficient color component in pixels for R is generated.

FIG. 3 is a diagram for explaining pixels referred to when a sensitivity level value of the insufficient color component in the pixels for R is generated. A pixel R0 is a pixel of attention as a target for which a sensitivity level value of an insufficient color component is calculated. The pixel R0 has the R component as an acquired color component. Pixels R1 to R4 (a pixel R1, a pixel R2, a pixel R3, and a pixel R4) are pixels for R located near the pixel R0. The pixel R2, the pixel R0, and the pixel R4 are arrayed in parallel in the H direction via the pixels for G. The pixel R1, the pixel R0, and the pixel R3 are arrayed in parallel in the V direction via the pixels for G. The pixels R1 to R4 are first reference pixels having the R components as acquired color components like the pixel R0. R0, R1, R2, R3, and R4 simply referred to herein respectively represent sensitivity level values of the R components in the pixel R0 and the pixels R1 to R4.

Pixels B1 to B4 (a pixel B1, a pixel B2, a pixel B3, and a pixel B4) are pixels for B located near the pixel R0. The pixels B1 to B4 have the B components as acquired color components. The pixels B1 to B4 are adjacent to the pixel R0 in oblique directions with respect to the H direction and the V direction. The pixels B1 to B4 are second reference pixels having the B components, which are color components other than an acquired color component of the pixel R0, as acquired color components. B1, B2, B3, and B4 simply referred to herein respectively represent sensitivity level values of the B components in the pixels B1 to B4.

Figure 4:
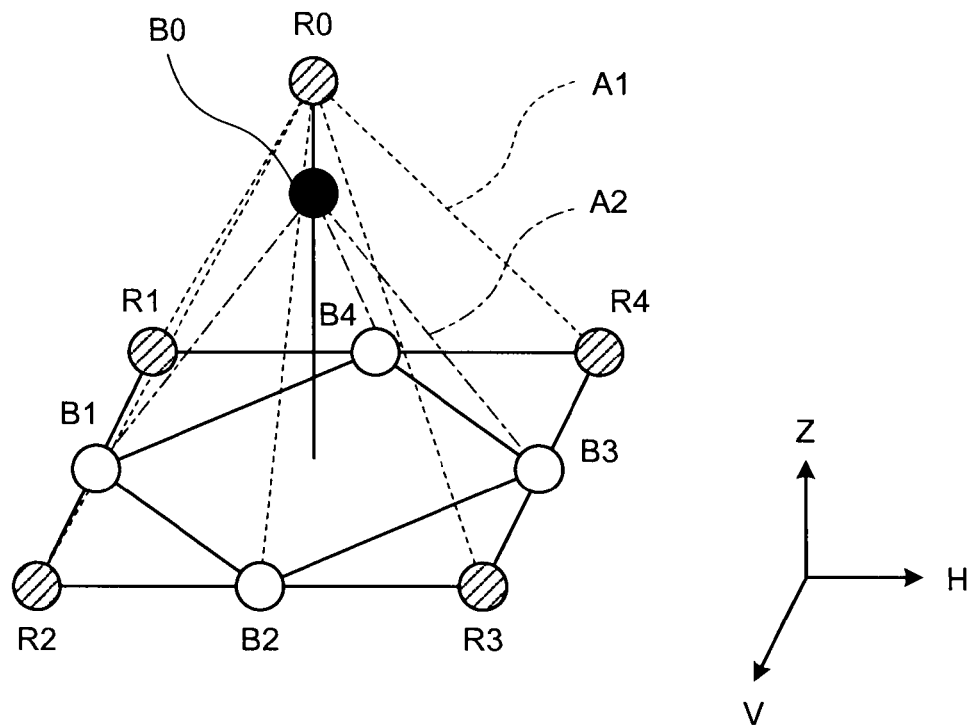
FIG. 4 is a diagram of an example of a distribution of sensitivity level values of a pixel of attention, first reference pixels, and second reference pixels.

FIG. 4 is a diagram of an example of a distribution of sensitivity level values of the pixel of attention, the first reference pixels, and the second reference pixels. A height direction perpendicular to the H direction and the V direction in which the pixels are arrayed is represented as Z direction. An axis in the Z direction is assumed as an axis representing a sensitivity level value. Circles denoted by reference signs same as the reference signs shown in FIG. 3 respectively represent sensitivity level values acquired for the pixels. A black circle represents a sensitivity level value B0 of the B component insufficient in the pixel of attention R0.

In a three-dimensional space including the H direction, the V direction, and the Z direction, a pyramid shape A1 including R0, R1, R2, R3, and R4 as vertexes is assumed. The pyramid shape A1 is a first geometric figure. A pyramid shape A2 including B1, B2, B3, and B4 as vertexes is assumed. The pyramid shape A2 is a second geometric figure. The pixel-interpolation processing unit 14 calculates B0 that makes the pyramid shape A2 linearly similar to the pyramid shape A1.

Figure 5:
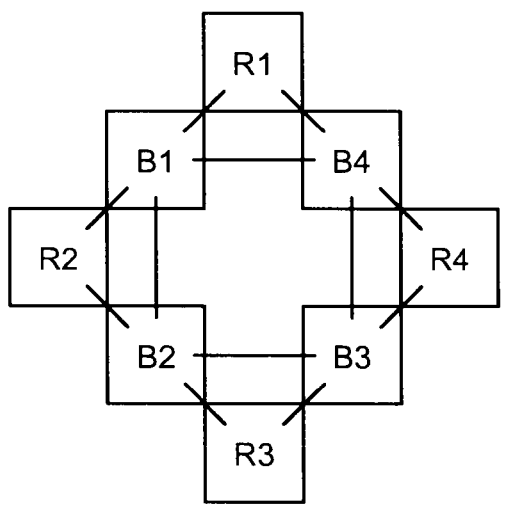
FIG. 5 is a diagram for explaining reference pixels and an area ratio of a pyramid shape in two-dimensional directions.

FIG. 5 is a diagram for explaining the reference pixels shown in FIG. 3 and an area ratio of the pyramid shapes A1 and A2 in the two-dimensional directions. An area of a square obtained by connecting B1 to B4 in the two-dimensional directions is a half of an area of a square obtained by connecting R1 to R4 in the two-dimensional directions. The area ratio explained herein is equivalent to a ratio of energy of the R components in the pixels R1 to R4 and energy of the B components in the pixels B1 to B4. A difference between an interpolation value of B0 and an interpolation value of B1 to B4 is a half of a difference between an interpolation value of R0 and an interpolation value of R1 to R4. The pixel-interpolation processing unit 14 calculates B0 from such a relation.

Pixels G1 to G4 (a pixel G1, a pixel G2, a pixel G3, and a pixel G4) shown in FIG. 3 are pixels for G located near the pixel R0 and have G components as acquired color components. The pixels G1 to G4 are adjacent to the pixel R0 in the H direction and the V direction. The pixels G1 to G4 are second reference pixels having the G components, which are color components other than the acquired color component of the pixel R0, as acquired color components. G1, G2, G3, and G4 simply referred to herein respectively represent sensitivity level values of the G components in the pixels G1 to G4.

Figure 6:
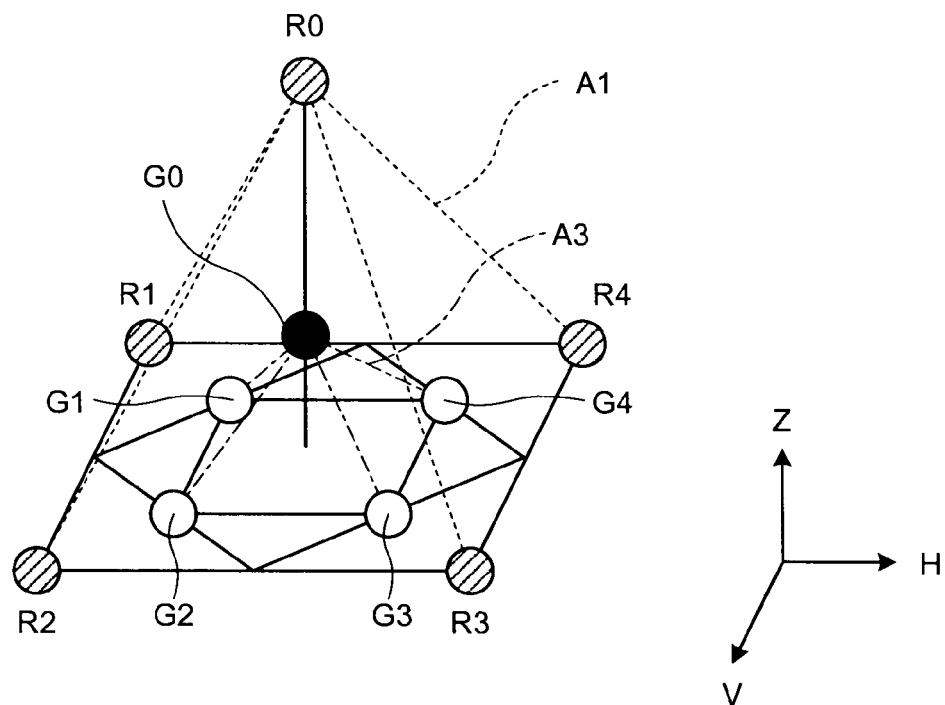
FIG. 6 is a diagram of an example of a distribution of sensitivity level values of a pixel of attention, first reference pixels, and second reference pixels.

FIG. 6 is a diagram of an example of a distribution of sensitivity level values of the pixel of attention, the first reference pixels, and the second reference pixels. A black circle represents a sensitivity level G0 of the G component insufficient in the pixel of attention R0. As in the case of the B components, concerning the G components, a pyramid shape A3 including G1, G2, G3, and G4 as vertexes is assumed. The pyramid shape A3 is a second geometric figure. The pixel-interpolation processing unit 14 calculates G0 that makes the pyramid shape A3 linearly similar to the pyramid shape A1.

An area of a square obtained by connecting G1 to G4 in the two-dimensional directions of the H direction and the V direction is a quarter of an area of a square obtained by connecting R1 to R4 in the two-dimensional direction. An area ratio explained herein is equivalent to a ratio of energy of the R components in the pixels R1 to R4 and energy of the G components in the pixels G1 to G4. A difference between an interpolation value of G0 and an interpolation value of G1 to G4 is a quarter of a difference between an interpolation value of R0 and an interpolation value of R1 to R4. The pixel-interpolation processing unit 14 calculates G0 from such a relation.

When attention is paid to the acquired color components of the pixels, in the case of the Bayer array, the pixels for R and the pixels for B are alternately arranged the oblique directions among the two-dimensional directions. Forms of arrays of the pixels for R and the pixels for B are the same because the pixels for R and the pixels for B are adjacent to the pixels for G in both the H direction and the V direction. Therefore, when the pixel for B is set as a pixel of attention, as in the case of the pixel for R, sensitivity level values of the R components and the G components as insufficient color components can be calculated by using a pyramid shape as a geometric figure. On the other hand, the pixels for G are adjacent to one another in the oblique directions among the two-dimensional directions. A form of an array of the pixels for G is different from those of both the pixels for R and the pixels for B.

Figure 7:
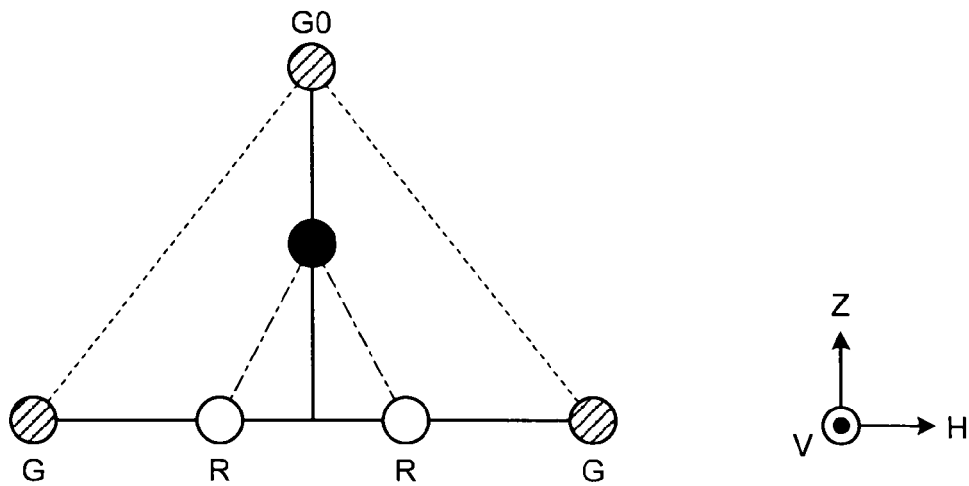
FIG. 7 is a diagram of an example in which sensitivity level values are calculated by assuming a triangle as a geometric figure.

Therefore, to calculate sensitivity level values of the R components and the B components in the pixels for G by adopting a method same as the method for the pixels for R and the pixels for B, a shape other than the pyramid shape, for example, a triangle in a plane including the Z direction as shown in FIG. 7 is assumed. When a geometric figure different according to an acquired color component of a pixel of attention is assumed, in some case, a difference occurs in accuracy of an arithmetic operation for a sensitivity level value of an insufficient color component. When a triangle is used as the geometric figure, the number of pixels referred to is small compared with that in the case of the pyramid. Therefore, the R light and the B light having low sensitivity compared with the G light are interpolated with a smaller number of data. Consequently, the interpolation tends to be affected by output fluctuation in the pixels and the accuracy is further deteriorated.

Figure 8:
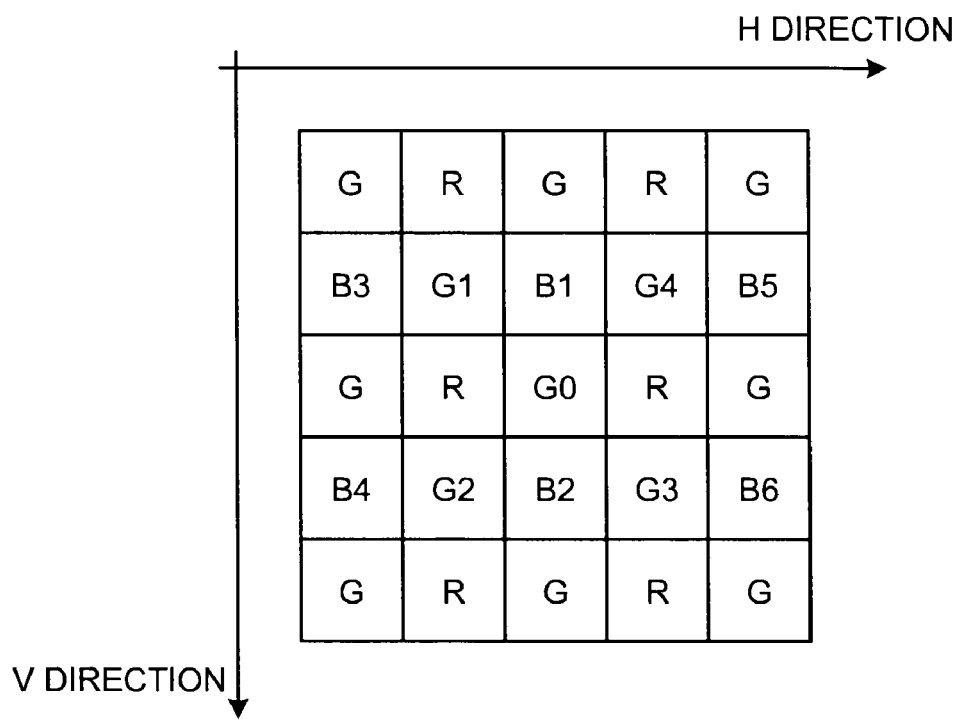
FIG. 8 is a diagram for explaining a method of generating sensitivity level values of B components in pixels for G.
Figure 9:
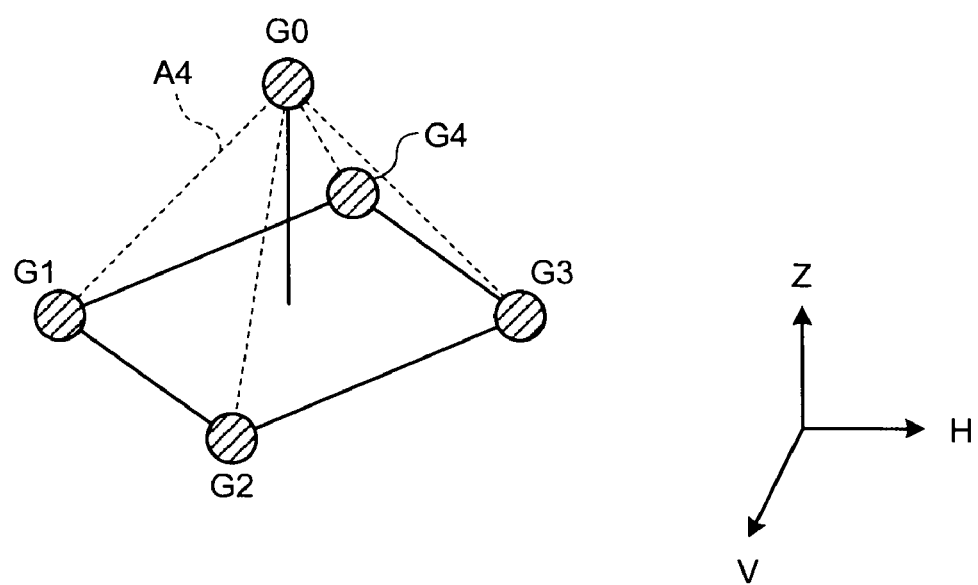
FIG. 9 is a diagram of an example of a distribution of sensitivity level values.

A method of generating sensitivity level values of the B components in the pixels for G according to this embodiment is explained below. Pixels G1 to G4 shown in FIG. 8 are pixels for G located near a pixel G0 as a pixel of attention. The pixels G1 to G4 are adjacent to the pixel G0 in the oblique directions with respect to the H direction and the V direction. As indicated by an example of a distribution of sensitivity level values shown in FIG. 9, concerning the G components, a pyramid A4 having G0 to G4 as vertexes is assumed.

A pixel B1 and a pixel B2 are arrayed in parallel in the V direction via the pixel G0. A pixel B3 and the pixel B1 are arrayed in parallel in the H direction via the pixel G1. A pixel B4 and the pixel B2 are arrayed in parallel in the H direction via the pixel G2. The pixel B2 and a pixel B6 are arrayed in parallel in the H direction via the pixel G3. The pixel B1 and a pixel B5 are arrayed in parallel in the H direction via the pixel G4. The pixels B1 to B6 are second reference pixels having the B components, which are components other than an acquired color component of the pixel G0, as acquired color components.

Figure 10:
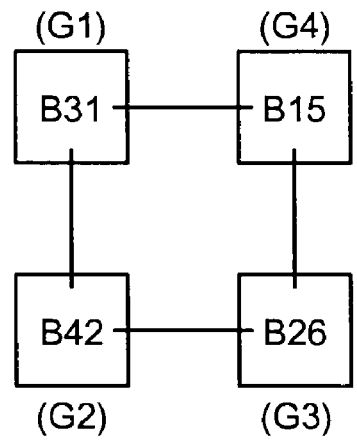
FIG. 10 is a diagram for explaining generation of interpolated sensitivity level values for second reference pixels.

FIG. 10 is a diagram for explaining generation of interpolated sensitivity level values for the second reference pixels. When an acquired color component of a pixel of attention is the G component, which is a specific color component, the pixel-interpolation processing unit 14 generates interpolated sensitivity level values for the second reference pixels according to interpolation of acquired sensitivity level values, for example, linear interpolation. Four interpolated sensitivity level values for the B components are generated for six second reference pixels. For the pixel B3 and the pixel B1, an interpolated sensitivity level value B31 of B3 and B1 is generated. The position of B31 is set in the position of the pixel G1 between the pixel B3 and the pixel B1. For the pixel B4 and the pixel B2, an interpolated sensitivity level value B42 of B4 and B2 is generated. The position of B42 is set in the position of the pixel G2 between the pixel B4 and the pixel B2. For the pixel B2 and the pixel B6, an interpolated sensitivity level value B26 of B2 and B6 is generated. The position of B26 is set in the position of the pixel G3 between the pixel B2 and the pixel B6. For the pixel B1 and the pixel B5, an interpolated sensitivity level value B15 of B1 and B5 is generated. The position of B15 is set in the position of the pixel G4 between the pixel B1 and the pixel B5.

Figure 11:
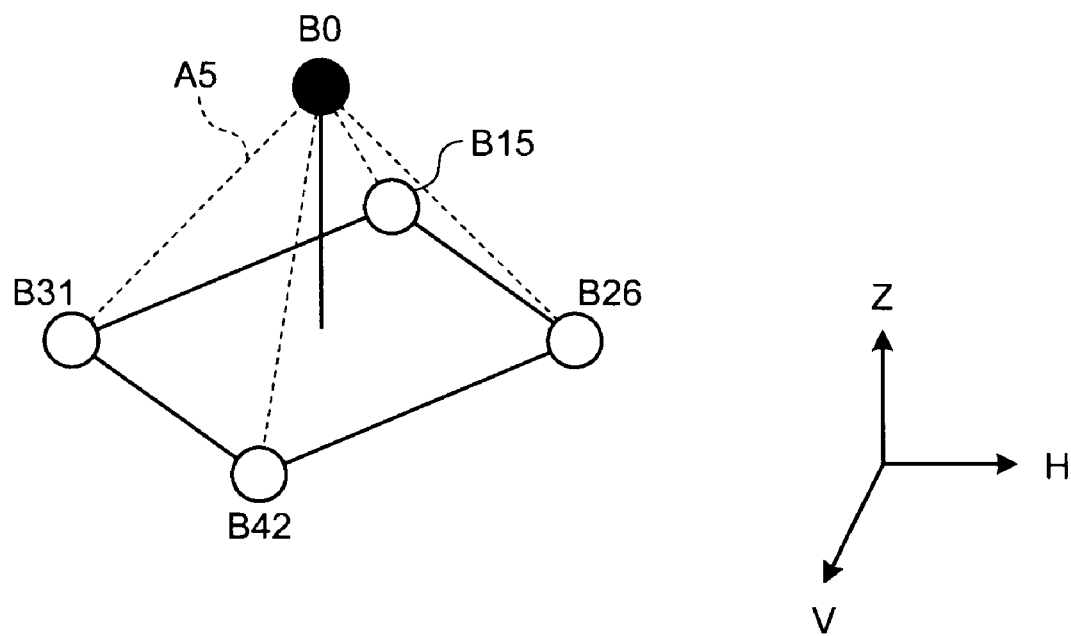
FIG. 11 is a diagram of an example of a distribution of interpolated sensitivity level values generated for the second reference pixels.

FIG. 11 is a diagram of an example of a distribution of interpolated sensitivity level values generated for the second reference pixels. A black circle represents a sensitivity level value B0 of the B component insufficient in the pixel of attention G0. Concerning the pixels B1 to B6, a pyramid A5 including B31, B42, B26, and B15 as vertexes is assumed as a second geometric figure. The pixel-interpolation processing unit 14 calculates B0 that makes the pyramid A5 linearly similar to the pyramid A4.

An area of a square obtained by connecting G1 to G4 in the two-dimensional direction and an area of a square obtained by connecting B31, B42, B26, and B15 are the same. Energy of the G components in the pixels G1 to G4 and energy of the B components in the pixels B1 to B6 are the same. A difference between an interpolation value of G0 and an interpolation value of G1 to G4 and a difference between an interpolation value of B0 and an interpolation value of B31, B42, B26, and B15 are the same. The pixel-interpolation processing unit 14 calculates B0 from this relation.

Figure 12:
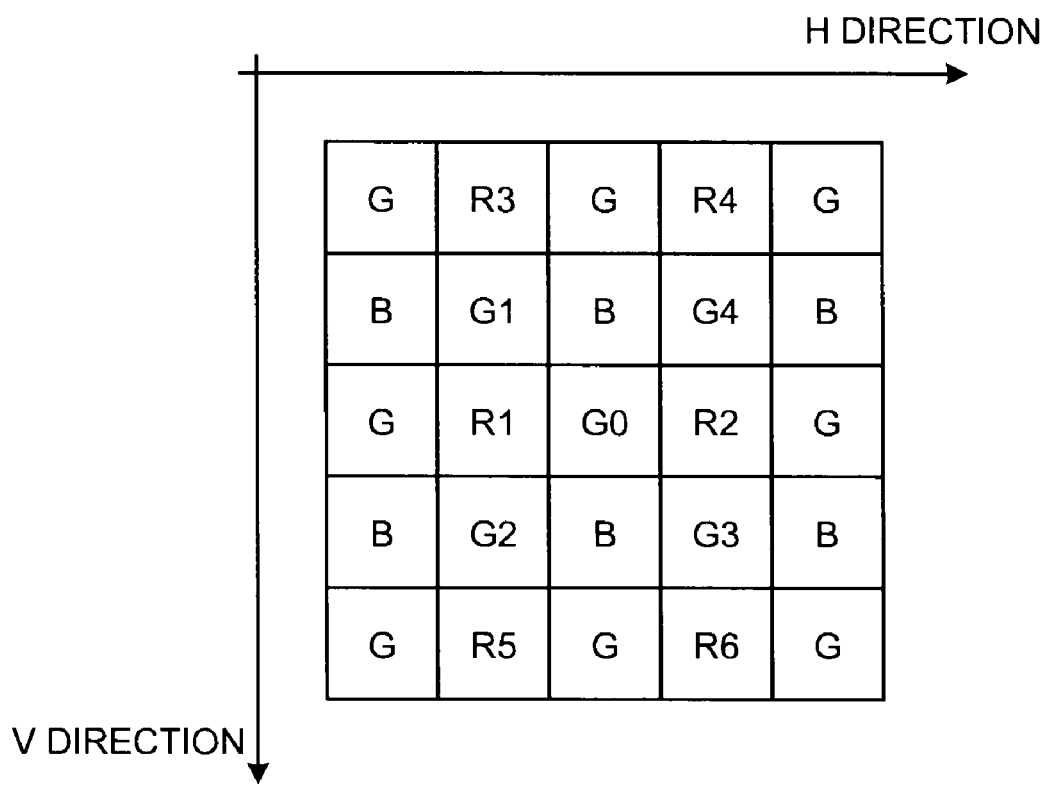
FIG. 12 is a diagram for explaining a method of generating sensitivity level values of R components in pixels for G.
Figure 13:
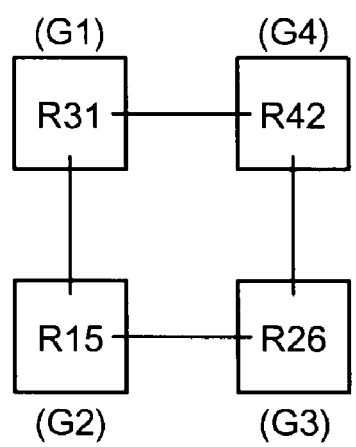
FIG. 13 is a diagram for explaining generation of interpolated sensitivity level values for second reference pixels.

Generation of the sensitivity level value R0 of the R component in the pixel G0 is explained below with reference to FIGS. 12 and 13. A pixel R1 and a pixel R2 are arrayed in parallel in the H direction via the pixel G0. A pixel R3 and the pixel R1 are arrayed in parallel in the V direction via the pixel G1. The pixel R1 and a pixel R5 are arrayed in parallel in the V direction via the pixel G2. The pixel R2 and a pixel R6 are arrayed in parallel in the V direction via the pixel G3. A pixel R4 and the pixel R2 are arrayed in parallel in the V direction via the pixel G4. The pixels R1 to R6 are second reference pixels having the R components, which are color components other than the acquired color component of the pixel G0, as acquired color components.

For the R components, as for the G components, four interpolated sensitivity level values are generated for six second reference pixels. For the pixel R3 and the pixel R1, an interpolated sensitivity level value R31 of R3 and R1 is generated. The position of R31 is set in the position of the pixel G1 between the pixel R3 and the pixel R1. For the pixel R1 and the pixel R5, an interpolated sensitivity level value R15 of R1 and R5 is generated. The position of R15 is set in the position of the pixel G2 between the pixel R1 and the pixel R5. For the pixels R2 and the pixel R6, an interpolated sensitivity level value R26 of R2 and R6 is generated. The position of R26 is set in the position of the pixel G3 between the pixel R2 and the pixel R6. For the pixel R4 and the pixel R2, an interpolated sensitivity level value R42 of R4 an R2 is generated. The position of R42 is set in the position of the pixel G4 between the pixel R4 and the pixel R2.

Concerning the pixels R1 to R6, a pyramid including R31, R15, R26, and R42 as vertexes is assumed as a second geometric figure. The pixel-interpolation processing unit 14 calculates R0 that makes such a pyramid linearly similar to the pyramid A4 as the first geometric figure. The pixel-interpolation processing unit 14 calculates R0 with an arithmetic operation same as that for B0. In this way, irrespectively of a pixel of which color is a pixel of attention, the pixel-interpolation processing unit 14 uses the pyramid, which is the same figure, as a geometric figure.

Figure 14:
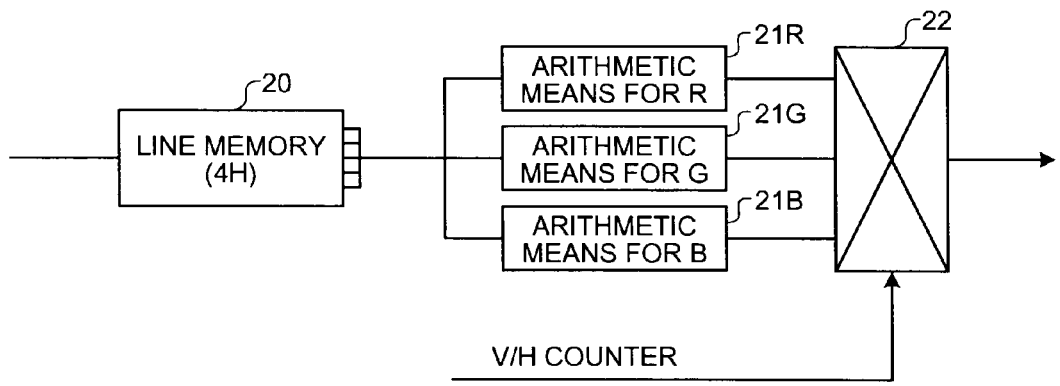
FIG. 14 is a block diagram of an example of the configuration of a pixel-interpolation processing unit.

FIG. 14 is a block diagram of an example of the configuration of the pixel-interpolation processing unit 14. The pixel-interpolation processing unit 14 includes a 4H line memory 20, an arithmetic unit for R 21R, an arithmetic unit for G 21G, an arithmetic unit for B 21B, and a selector 22. The line memory 20 stores digital image signals for four lines. The arithmetic unit for R 21R is an arithmetic unit for pixel interpolation processing performed when the pixel of attention is a pixel for R. The arithmetic unit for G 21G is an arithmetic unit for pixel interpolation processing performed when the pixel of attention is a pixel for G. The arithmetic unit for B 21B is an arithmetic unit for pixel interpolation processing performed when the pixel of attention is a pixel for B. The selector 22 selects the arithmetic unit for R 21R, the arithmetic unit for G 21G, and the arithmetic unit for B 21B according to a count value of a V/H counter.

The pixel-interpolation processing unit 14 acquires pixel signals for twenty-five pixels (five pixels in the H direction× five pixels in the V direction) from five lines in total including four lines held by the line memory 20 and one line as a main line. The selector 22 determines, according to a count value of the V/H counter, which of the pixel for R, the pixel for G, and the pixel for B a pixel in the center as the pixel of attention among the acquired twenty-five pixels is. When the pixel of attention is the pixel for R, the selector 22 selects an arithmetic operation by the arithmetic unit for R 21R. When the pixel of attention is the pixel for G, the selector 22 selects an arithmetic operation by the arithmetic unit for G 21G. When the pixel of attention is the pixel for B, the selector 22 selects an arithmetic operation by the arithmetic unit for B 21B. The arithmetic units for the respective colors 21R, 21G, and 21B specify first reference pixels and second reference pixels from the acquired twenty-five pixels and output a sensitivity level value of an insufficient color component in the pixel of attention.

Figure 15:
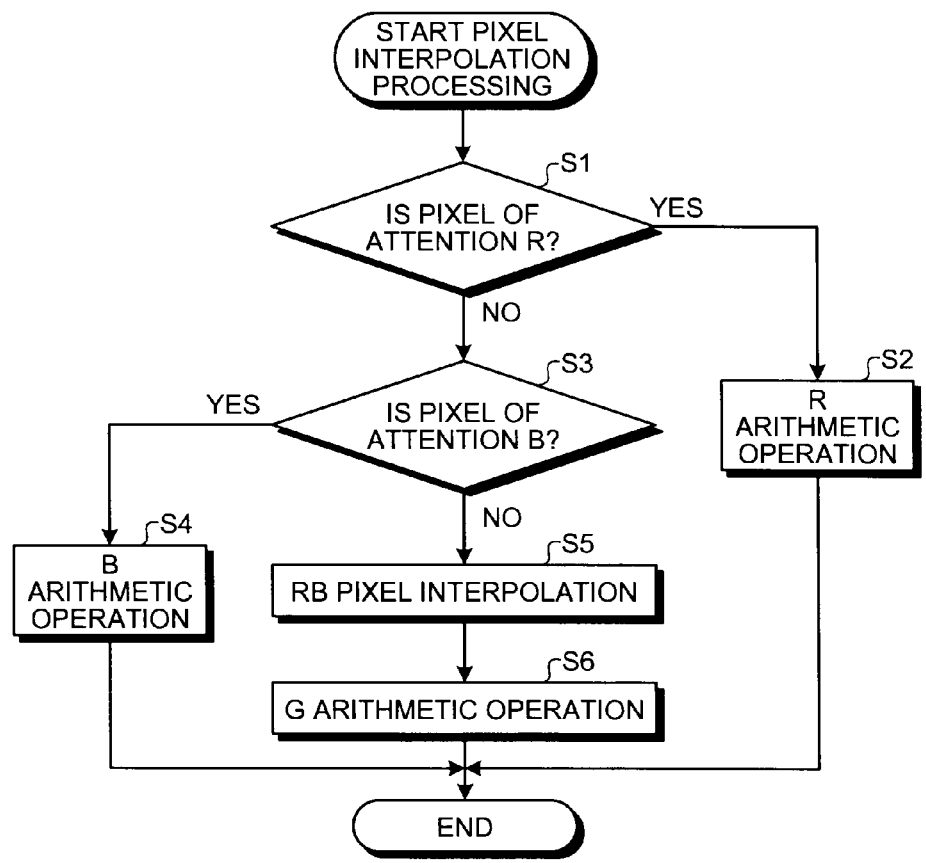
FIG. 15 is a flowchart for explaining the operation of the pixel-interpolation processing unit.

FIG. 15 is a flowchart for explaining the operation of the pixel-interpolation processing unit 14. At step S1, the pixel-interpolation processing unit 14 determines whether the pixel of attention is the pixel for R. When the pixel of attention is the pixel for R ("Yes" at step S1), the pixel-interpolation processing unit 14 generates, according to the arithmetic operation by the arithmetic unit for R 21R, sensitivity level values of the G component and the B component in the pixel of attention (step S2). When the pixel of attention is not the pixel for R ("No" at step S1), the pixel-interpolation processing unit 14 determines, at step S3, whether the pixel of attention is the pixel for B. When the pixel of attention is the pixel for B ("Yes" at step S3), the pixel-interpolation processing unit 14 generates sensitivity level values of the R component and the G component in the pixel of attention (step S4).

When the pixel of attention is not the pixel for B either ("No" at step S3), the pixel-interpolation processing unit 14 determines that the pixel of attention is the pixel for G. According to the arithmetic operation by the arithmetic unit for G 21G, the pixel-interpolation processing unit 14 calculates interpolated sensitivity level values respectively for the second reference pixels for the R component and the second reference pixels for the B component (step S5). Subsequently, the pixel-interpolation processing unit 14 generates sensitivity level values of the R component and the B component in the pixel of attention using the interpolated sensitivity level values calculated at step S5 (step S6).

The pixel-interpolation processing unit 14 ends the pixel interpolation processing for the pixel of attention by ending any one of the arithmetic operation by the arithmetic unit for R 21R (step S2), the arithmetic operation by the arithmetic unit for B 21B (step S4), and the arithmetic operation by the arithmetic unit for G 21G (step S6). The pixel-interpolation processing unit 14 executes such pixel interpolation processing for all the pixels. The order of steps S1 and S3 is arbitrary. Steps S1 and S3 can be simultaneously performed.

Consequently, the same figure is used as the geometric figure irrespectively of a pixel of which color the pixel of attention is. Therefore, concerning a sensitivity level value of the insufficient color component, it is possible to reduce a difference in accuracy among the arithmetic operations. When the pixel for G is set as the pixel of attention, if the pyramid is used as the geometric figure, pixels referred to in order to generate a sensitivity level value of the insufficient color component can be increased compared with that in the case of the triangle. Because the number of data used for interpolation of the R light and the B light having low sensitivity compared with the G light can increased, it is possible to reduce the influence of output fluctuation in the pixels. Consequently, there is an effect that it is possible to highly accurately generate a sensitivity level value of the insufficient color component. Because the B light has small spectral transmittance compared with that of the R light and the G light, an S/N ratio of the B light tends to be deteriorated in the 1CCD imaging device. The image processing device 4 according to this embodiment generates a sensitivity level value of the insufficient color component using interpolated sensitivity level values. This makes it possible to obtain an effect that S/N ratios are improved for image signals of R, G, and B that are finally output.

A second embodiment of the present invention is characterized in that pixels for G are classified into Gr pixels and Gb pixels and interpolated sensitivity level values by interpolation of the Gr pixels and interpolation sensitivity level values by interpolation of the Gb pixels are calculated. The Gr pixels are first pixels for green located in rows in which pixels for R are arrayed in parallel in the H direction among the pixels for G. The Gb pixels are second pixels for green located in rows in which pixels for B are arrayed in parallel in the H direction. The Gr pixels are pixels for G having the same form of arrays in two-dimensional directions because the Gr pixels are adjacent to the pixels for R in the H direction. The Gb pixels are pixels for G having the same form of arrays in the two-dimensional directions because the Gb pixels are adjacent to the pixels for B in the H direction.

Figure 16:
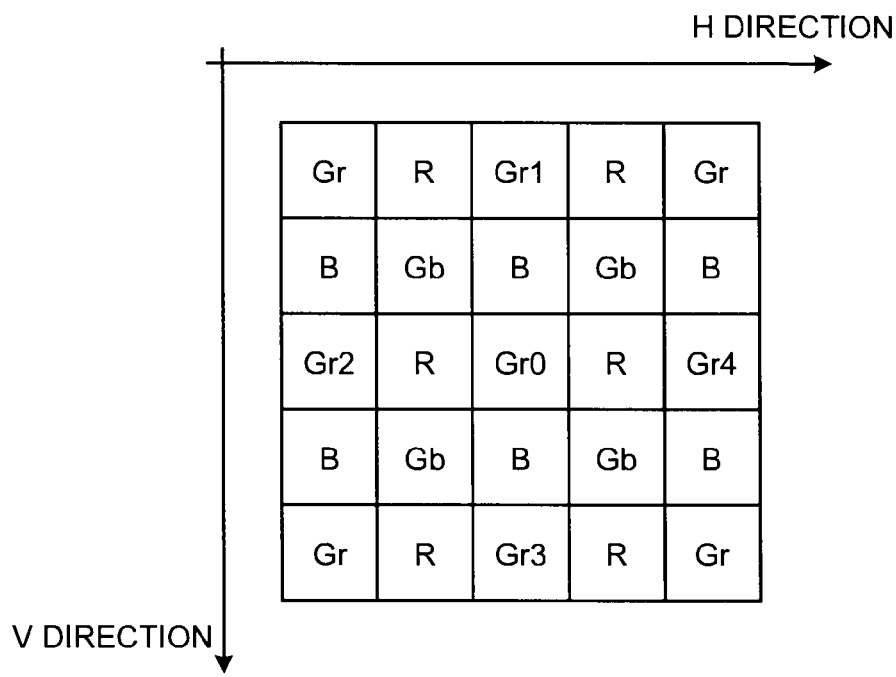
FIG. 16 is a diagram for explaining calculation of interpolated sensitivity level values performed when a Gr pixel is set as a pixel of attention.

FIG. 16 is a diagram for explaining calculation of interpolated sensitivity level values performed when a Gr pixel is set as a pixel of attention. Pixels Gr1 to Gr4 (a pixel Gr1, a pixel Gr2, a pixel Gr3, and a pixel Gr4) are Gr pixels located near a pixel Gr0 as a pixel of attention. The pixel Gr2, the pixel Gr0, and the pixel Gr4 are arrayed in parallel in the H direction via the pixels for R. The pixel Gr1, the pixel Gr0, and the pixel Gr3 are arrayed in parallel in the V direction via pixels for B. A sensitivity level value of a G component in the pixel Gr0 is an interpolated sensitivity level value generated by interpolation performed by using Gr1, Gr2, Gr3, and Gr4. Gr1, Gr2, Gr3, and Gr4 simply referred to herein respectively represent sensitivity level values of G components in the pixels Gr1 to Gr4.

Figure 17:
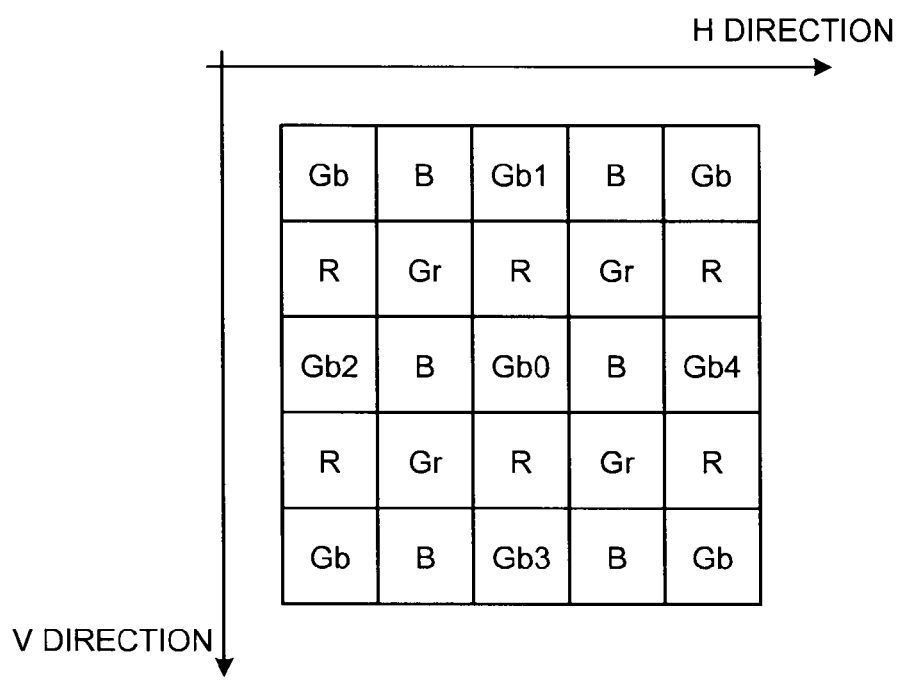
FIG. 17 is a diagram for explaining calculation of interpolated sensitivity level values performed when a Gb pixel is set as a pixel of attention.

FIG. 17 is a diagram for explaining calculation of interpolated sensitivity level values performed when a Gr pixel is set as the pixel of attention. Pixels Gb1 to Gb4 (a pixel Gb1, a pixel Gb2, a pixel Gb3, and a pixel Gb4) are Gb pixels located near a pixel Gb0 as the pixel of attention. The pixel Gb2, the pixel Gb0, and the pixel Gb4 are arrayed in parallel in the H direction via the pixels for B. The pixel Gb1, the pixel Gb0, and the pixel Gb3 are arrayed in parallel in the V direction via the pixels for R. A sensitivity level value of a G component in the pixel Gb0 is an interpolated sensitivity level value generated by interpolation using Gb1, Gb2, Gb3, and Gb4. Gg1, Gb2, Gb3, and Gb4 simply referred to herein respectively represent sensitivity level values of G components in the pixels Gb1 to Gb4. In this way, the arithmetic unit for G 21G (see FIG. 14) outputs the interpolated sensitivity level value as the sensitivity level value of the G component in the pixel of attention.

Figure 18:
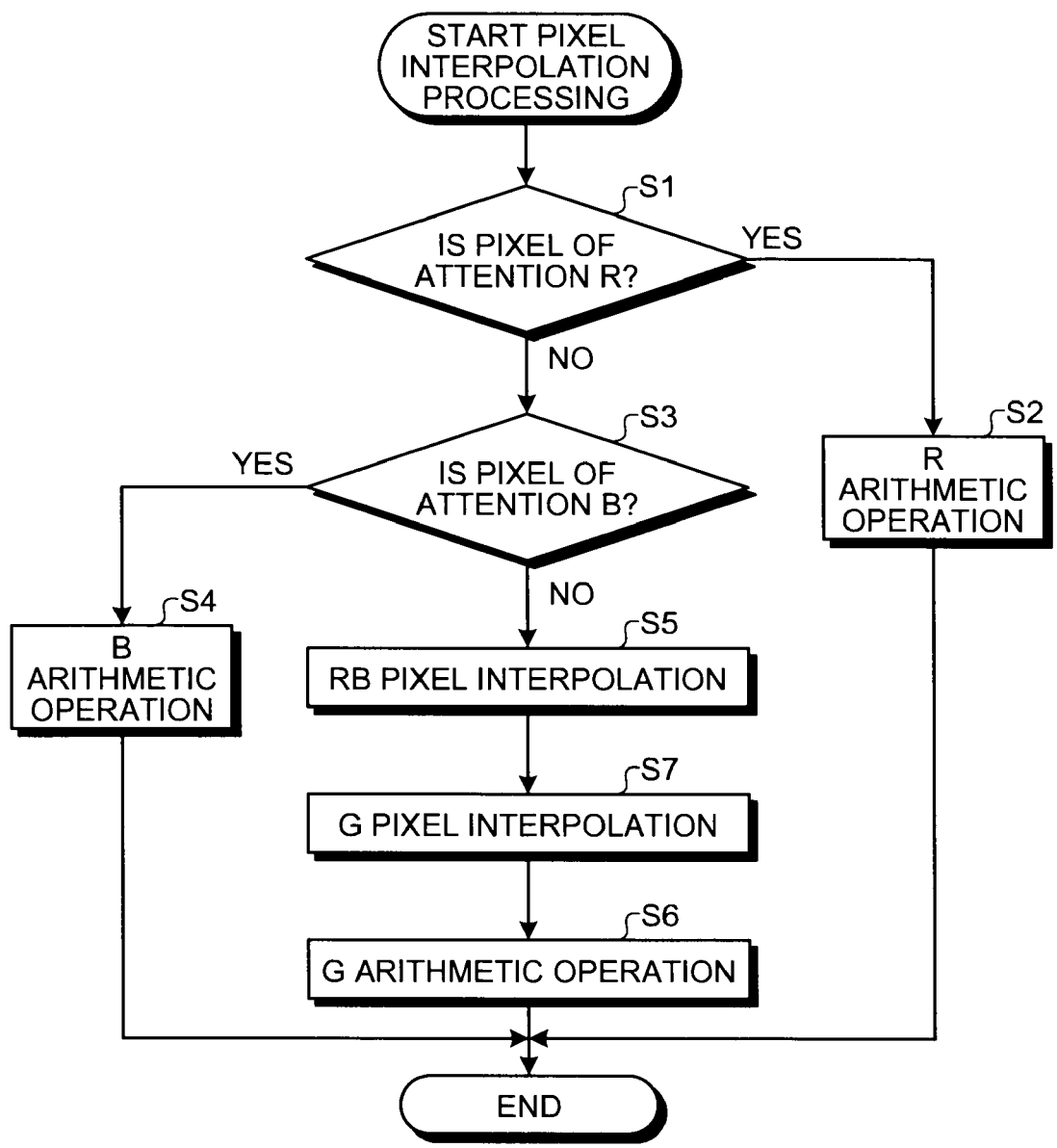
FIG. 18 is a flowchart for explaining the operation of the pixel-interpolation processing unit.

FIG. 18 is a flowchart for explaining the operation of the pixel-interpolation processing unit 14. Steps S1 to S6 are the same as the steps explained in the first embodiment. Therefore, explanation of the steps is omitted. In this embodiment, the pixel-interpolation processing unit 14 calculates an interpolated sensitivity level value of the pixel for G at step S7 between the calculation of interpolated sensitivity level values for the pixel for R and the pixel for B at step S5 and the arithmetic operation by the arithmetic unit for G 21G at step S6. The order of steps S5 and S7 is arbitrary. Steps S5 and S7 can be simultaneously performed.

The image pickup unit 3 (see FIG. 1) uses a color filter for G for both the Gr pixel and the Gb pixel. Spatial position conditions are different in the Gr pixel and the Gb pixel. Therefore, in some case, because of wiring in the photoelectric element of the image pickup unit 3, a difference occurs in an amount of light that can be actually condensed. In the case of a CMOS sensor, in some case, a difference occurs in influence of color mixing or the like between the Gr pixel and the Gb pixel. In this embodiment, the pixel-interpolation processing unit 14 generates, for the pixels for G, interpolated sensitivity level values from pixels having the same characteristic. This makes it possible to perform a highly accurate arithmetic operation for sensitivity level value.

A third embodiment of the present invention is characterized in that sensitivity level values of G components are respectively corrected for a pixel Gr0 and a pixel Gb0 according to interpolated sensitivity level values by interpolation of Gr pixels and interpolated sensitivity level values by interpolation of Gb pixels. This embodiment is explained below with reference to FIGS. 16 and 17.

The arithmetic unit for G 21G (se FIG. 14) calculates a predetermined ratio of interpolated sensitivity level values generated by interpolation using Gr1, Gr2, Gr3, and Gr4 and interpolated sensitivity level values generated by interpolation using Gb1, Gb2, Gb3, and Gb4. The arithmetic unit for G 21G corrects, with the calculated predetermined ratio set as a parameter, a sensitivity level value of the G component in the pixel Gr0 and a sensitivity level value of the G component in the pixel Gb0.

When an output difference occurs between a Gr pixel and a Gb pixel, color reproducibility falls because a difference occurs in an amount of light of the G components in the oblique directions. According to this embodiment, sensitivity level values of the G components in the pixels for G are corrected by taking into account a characteristic difference between the Gr pixel and the Gb pixel. This makes it possible to perform a highly accurate arithmetic operation for the sensitivity level values.

FIG. 19 is a diagram for explaining examples of arithmetic expressions for generating a sensitivity level value of an insufficient color component. In the figure, in order from the top, an arithmetic expression adopted when the pixel of attention is the pixel for R, an arithmetic expression adopted when the pixel of attention is the pixel for B, an arithmetic expression adopted when the pixel of attention is the Gr pixel, and an arithmetic expression adopted when the pixel of attention is the Gb pixel are shown. When the pixel of attention is the pixel for R and when the pixel of attention is the pixel for B, the arithmetic expressions are the same as those explained in the first embodiment. When the pixel of attention is the Gr pixel and when the pixel of attention is the Gb pixel, the arithmetic expressions are the same as those explained in the third embodiment. A value obtained by dividing a sum of a plurality of sensitivity level values by the number of data is used as an interpolation value. As a method of interpolation, any method known in the past can be used. The arithmetic expressions can be modified as appropriate according to the method of interpolation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising a pixel-interpolation processing unit that generates a sensitivity level value of an insufficient color component according to interpolation processing of image signals obtained by image pickup of a subject image, wherein the pixel-interpolation processing unit includes an arithmetic unit that outputs a sensitivity level value of the insufficient color component in the pixel of attention according to an arithmetic operation corresponding to an acquired color component, a sensitivity level value of which is acquired for the pixel of attention, and with an axis in a height direction perpendicular to two-dimensional directions, in which pixels are arrayed, set as an axis representing a sensitivity level value, assuming a first geometric figure that is a geometric figure including, as vertexes, the sensitivity level value acquired for the pixel of attention and sensitivity level values acquired for a plurality of first reference pixels that are pixels located near the pixel of attention and have acquired color components same as that of the pixel of attention, and a second geometric figure that is a geometric figure including, as vertexes, acquired sensitivity level values for a plurality of second reference pixels that have color components other than the acquired component of the pixel of attention as acquired color components and are located near the pixel of attention, the arithmetic unit calculates, such that the second geometric figure has a shape similar to that of the first geometric figure, a sensitivity level value of the insufficient color component in the pixel of attention and uses a same figure as the geometric figure irrespectively of which color component the acquired color component of the pixel of attention is.

2. The image processing device according to claim 1, wherein, when the acquired color component of the pixel of attention is a specific color component, the arithmetic unit generates, according to interpolation of acquired sensitivity level values, interpolated sensitivity level values for the second reference pixels and sets, as vertexes of the second geometric figure, the interpolated sensitivity level values located among the second reference pixels.

3. The image processing device according to claim 1, wherein, when the acquired color component of the pixel of attention is a specific color component, the arithmetic unit generates, according to interpolation of acquired sensitivity level values, an interpolated sensitivity level value for pixels having a same form of arrays in the two-dimensional directions when attention is paid to acquired color components of pixels and outputs the interpolated sensitivity level value as a sensitivity level value of the specific color component in the pixel of attention.

4. The image processing device according to claim 1, wherein
pixels for red having red components as acquired color components, pixels for green having green components as acquired color components, and pixels for blue having blue components as acquired color components are arrayed in a Bayer array,
the pixels for green are classified into first pixels for green as the pixels for green located in rows in which pixels for red are arrayed in parallel and second pixels for green as the pixels for green located in rows in which the pixels for blue are arrayed in parallel, and
the arithmetic unit corrects, according to interpolated sensitivity level values generated by interpolation of sensitivity level values of the first pixels for green and interpolated sensitivity level values generated by interpolation of sensitivity level values of the second pixels for green, a sensitivity level value obtained when the pixel of attention is the pixel for green.

5. The image processing device according to claim 1, wherein the arithmetic unit calculates a sensitivity level value of the insufficient color component based on an interpolation value of sensitivity level values of the second reference pixels, a difference between a sensitivity level value of the acquired color component in the pixel of attention and an interpolation value of sensitivity level values of the first reference pixels, and an area ratio in the two-dimensional directions of the first geometric figure and the second geometric figure.

6. The image processing device according to claim 1, wherein the geometric shape is a pyramid shape.

7. The image processing device according to claim 1, wherein the pixel-interpolation processing unit includes:

an arithmetic unit for red as the arithmetic unit for pixel interpolation processing performed when the pixel of attention is a pixel for red;

an arithmetic unit for green as the arithmetic unit for pixel interpolation processing performed when the pixel of attention is a pixel for green; and an arithmetic unit for blue as the arithmetic unit for pixel interpolation processing performed when the pixel of attention is a pixel for blue.

8. An image processing method comprising:

generating a sensitivity level value of an insufficient color component according to interpolation processing of image signals obtained by image pickup of a subject image;

outputting a sensitivity level value of the insufficient color component in the pixel of attention according to an arithmetic operation corresponding to an acquired color component, a sensitivity level value of which is acquired for the pixel of attention;

with an axis in a height direction perpendicular to two-dimensional directions, in which pixels are arrayed, set as an axis representing a sensitivity level value, assuming a first geometric figure that is a geometric figure including, as vertexes, the sensitivity level value acquired for the pixel of attention and sensitivity level values acquired for a plurality of first reference pixels that are pixels located near the pixel of attention and have acquired color components same as that of the pixel of attention, and a second geometric figure that is a geometric figure including, as vertexes, acquired sensitivity level values for a plurality of second reference pixels that have color components other than the acquired component of the pixel of attention as acquired color components and are located near the pixel of attention, calculating, such that the second geometric figure has a shape similar to that of the first geometric figure, a sensitivity level value of the insufficient color component in the pixel of attention; and using a same figure as the geometric figure irrespectively of which color component the acquired color component of the pixel of attention is.

9. The image processing method according to claim 8, further comprising, when the acquired color component of the pixel of attention is a specific color component, generating, according to interpolation of acquired sensitivity level values, interpolated sensitivity level values for the second reference pixels and setting, as vertexes of the second geometric figure, the interpolated sensitivity level values located among the second reference pixels.

10. The image processing method according to claim 8, further comprising, when the acquired color component of the pixel of attention is a specific color component, generating, according to interpolation of acquired sensitivity level values, an interpolated sensitivity level value for pixels having a same form of arrays in the two-dimensional directions when attention is paid to acquired color components of pixels and outputting the interpolated sensitivity level value as a sensitivity level value of the specific color component in the pixel of attention.

11. The image processing device according to claim 8, wherein
pixels for red having red components as acquired color components, pixels for green having green components as acquired color components, and pixels for blue having blue components as acquired color components are arrayed in a Bayer array, the pixels for green are classified into first pixels for green as the pixels for green located in rows in which pixels for red are arrayed in parallel and second pixels for green as the pixels for green located in rows in which the pixels for blue are arrayed in parallel, and the image processing method further comprising correcting, according to interpolated sensitivity level values generated by interpolation of sensitivity level values of the first pixels for green and interpolated sensitivity level values generated by interpolation of sensitivity level values of the second pixels for green, a sensitivity level value obtained when the pixel of attention is the pixel for green.

12. The image processing method according to claim 8, further comprising calculating a sensitivity level value of the insufficient color component based on an interpolation value of sensitivity level values of the second reference pixels, a difference between a sensitivity level value of the acquired color component in the pixel of attention and an interpolation value of sensitivity level values of the first reference pixels, and an area ratio in the two-dimensional directions of the first geometric figure and the second geometric figure.

13. The image processing method according to claim 8, wherein the geometric shape is a pyramid shape.

14. The image processing method according to claim 8, further comprising:
   determining whether the pixel of attention is a pixel for red having a red component as an acquired color component, a pixel for green having a green component as an acquired color component, and a pixel for blue having a blue component as an acquired color component;
   generating, when it is determined that the pixel of attention is the pixel for red, sensitivity level values of the green component and the blue component in the pixel of attention;
   generating, when it is determined that the pixel of attention is the pixel for blue, sensitivity level values of the red component and the green component in the pixel of attention; and
   generating, when it is determined that the pixel of attention is the pixel for green, sensitivity level values of the red component and the blue components in the pixel of attention using interpolation sensitivity level values calculated respectively for the second reference pixels for the red component and the second reference pixels for the blue component.

15. An imaging device comprising an image processing device that applies image processing to image signals obtained by image pickup of a subject image, wherein
   the image processing device includes a pixel-interpolation processing unit that generates a sensitivity level value of an insufficient color component according to interpolation processing of the image signals,
   the pixel-interpolation processing unit includes an arithmetic unit that outputs a sensitivity level value of the insufficient color component in the pixel of attention according to an arithmetic operation corresponding to an acquired color component, a sensitivity level value of which is acquired for the pixel of attention, and
   with an axis in a height direction perpendicular to two-dimensional directions, in which pixels are arrayed, set as an axis representing a sensitivity level value,
   assuming a first geometric figure that is a geometric figure including, as vertexes, the sensitivity level value acquired for the pixel of attention and sensitivity level values acquired for a plurality of first reference pixels that are pixels located near the pixel of attention and have acquired color components same as that of the pixel of attention, and
   a second geometric figure that is a geometric figure including, as vertexes, acquired sensitivity level values for a plurality of second reference pixels that have color components other than the acquired component of the pixel of attention as acquired color components and are located near the pixel of attention,
   the arithmetic unit calculates, such that the second geometric figure has a shape similar to that of the first geometric figure, a sensitivity level value of the insufficient color component in the pixel of attention and uses a same figure as the geometric figure irrespectively of which color component the acquired color component of the pixel of attention is.

16. The image device according to claim 15, wherein, when the acquired color component of the pixel of attention is a specific color component, the arithmetic unit generates, according to interpolation of acquired sensitivity level values, interpolated sensitivity level values for the second reference pixels and sets, as vertexes of the second geometric figure, the interpolated sensitivity level values located among the second reference pixels.

17. The image device according to claim 15, wherein, when the acquired color component of the pixel of attention is a specific color component, the arithmetic unit generates, according to interpolation of acquired sensitivity level values, an interpolated sensitivity level value for pixels having a same form of arrays in the two-dimensional directions when attention is paid to acquired color components of pixels and outputs the interpolated sensitivity level value as a sensitivity level value of the specific color component in the pixel of attention.

18. The image device according to claim 15, wherein
   pixels for red having red components as acquired color components, pixels for green having green components as acquired color components, and pixels for blue having blue components as acquired color components are arrayed in a Bayer array,
   the pixels for green are classified into first pixels for green as the pixels for green located in rows in which pixels for red are arrayed in parallel and second pixels for green as the pixels for green located in rows in which the pixels for blue are arrayed in parallel, and the arithmetic unit corrects, according to interpolated sensitivity level values generated by interpolation of sensitivity level values of the first pixels for green and interpolated sensitivity level values generated by interpolation of sensitivity level values of the second pixels for green, a sensitivity level value obtained when the pixel of attention is the pixel for green.

19. The image device according to claim 15, wherein the arithmetic unit calculates a sensitivity level value of the insufficient color component based on an interpolation value of sensitivity level values of the second reference pixels, a difference between a sensitivity level value of the acquired color component in the pixel of attention and an interpolation value of sensitivity level values of the first reference pixels, and an area ratio in the two-dimensional directions of the first geometric figure and the second geometric figure.

20. The image device according to claim 15, wherein the geometric shape is a pyramid shape.

* * * * *